US010749850B2

(12) United States Patent
Bak et al.

(10) Patent No.: US 10,749,850 B2
(45) Date of Patent: Aug. 18, 2020

(54) METHOD FOR CHECKING A PARAMETER INDICATING A CONFIDENCE LEVEL ASSOCIATED WITH A USER ACCOUNT OF AN ONLINE SERVICE (71) Applicant: SAFRAN IDENTITY & SECURITY, Issy les Moulineaux (FR)

(72) Inventors: Naama Bak, Issy les Moulineaux (FR); Romain Picon, Issy les Moulineaux (FR); Rodolphe Hugel, Issy les Moulineaux (FR)

(73) Assignee: SAFRAN IDENTITY & SECURITY, Issy les Moulineaux (FR)

( * ) Notice: Subject to any disclaimer, the term of this patent is extended or adjusted under 35 U.S.C. 154(b) by 83 days.

(21) Appl. No.: 15/421,996

(22) Filed: Feb. 1, 2017

(65) Prior Publication Data
US 2017/0230348 A1 Aug. 10, 2017

(30) Foreign Application Priority Data

Feb. 9, 2016 (FR) .................................. 16 51028

(51) Int. Cl.
*H04L 29/06* (2006.01)
*G06F 21/42* (2013.01)

(52) U.S. Cl.
CPC .............. *H04L 63/08* (2013.01); *G06F 21/42* (2013.01); *H04L 63/062* (2013.01); *H04L 63/104* (2013.01); *H04L 63/101* (2013.01)

(58) Field of Classification Search
CPC ..... H04L 63/08; H04L 63/062; H04L 63/104; H04L 63/101; G06F 21/42
See application file for complete search history.

(56) References Cited

U.S. PATENT DOCUMENTS

| 8,688,742 | B2 * | 4/2014 | Fischer | G06Q 30/08 707/791 |
| 8,768,838 | B1 * | 7/2014 | Hoffman | G06Q 40/00 705/44 |

(Continued)

FOREIGN PATENT DOCUMENTS

WO 2012/042276 A2 4/2012
WO 2014/178893 A1 11/2014

OTHER PUBLICATIONS

Oct. 6, 2016 Search Report issued in French Patent Application No. 1651028.

Primary Examiner — Techane Gergiso
(74) Attorney, Agent, or Firm — Oliff PLC; R. Brian Drozd (57) ABSTRACT A method for checking a confidence level associated with a first user account of an online service, each user account including associated user data and contact means, the method includes the steps of selecting at least one second user account, generating a first code, recording the first code in association with the first user account, sending a first message via a contact means associated with the second user account, the first message including the first code generated and, in subsequent steps, of receiving, from a first electronic device connected to the online service with the first user account, a second message including a second code and, when the second code is equal to the first code recorded in association with the first user account, then increasing the value of the parameter indicating the confidence level associated with the first user account of the online service.

8 Claims, 3 Drawing Sheets (56) References Cited

U.S. PATENT DOCUMENTS

| | | | | |
|---|---|---|---|---|
| 9,787,662 | B1* | 10/2017 | Nair | G06Q 50/01 |
| 2011/0321129 | A1* | 12/2011 | Kinsel | G06F 16/9535 |
| | | | | 726/4 |
| 2012/0047560 | A1* | 2/2012 | Underwood | G06Q 10/06 |
| | | | | 726/4 |
| 2012/0150750 | A1* | 6/2012 | Law | G06Q 20/32 |
| | | | | 705/76 |
| 2012/0202587 | A1* | 8/2012 | Allen | G07F 17/3223 |
| | | | | 463/25 |
| 2013/0036458 | A1* | 2/2013 | Liberman | H04L 9/3231 |
| | | | | 726/6 |
| 2013/0174223 | A1* | 7/2013 | Dykeman | G06F 21/10 |
| | | | | 726/4 |
| 2014/0012928 | A1* | 1/2014 | Kim | H04L 51/12 |
| | | | | 709/206 |
| 2014/0150068 | A1* | 5/2014 | Janzer | H04L 63/20 |
| | | | | 726/4 |
| 2014/0188681 | A1* | 7/2014 | Shahghasemi | G06Q 20/22 |
| | | | | 705/37 |
| 2014/0279656 | A1* | 9/2014 | Ganesh | G06Q 10/0833 |
| | | | | 705/333 |
| 2015/0032738 | A1* | 1/2015 | Nachnani | G06F 16/285 |
| | | | | 707/723 |
| 2015/0067055 | A1* | 3/2015 | Khera | H04L 67/22 |
| | | | | 709/204 |

\* cited by examiner

METHOD FOR CHECKING A PARAMETER INDICATING A CONFIDENCE LEVEL ASSOCIATED WITH A USER ACCOUNT OF AN ONLINE SERVICE

TECHNICAL FIELD

The present invention relates to the field of on-line services, more particularly a method for adapting a parameter indicating a confidence level associated with a user account of such an online service.

PRIOR ART

Online services are developing and relate more and more to so-called crucial services, such as for example online services making it possible to access bank or tax services. It is essential to check the real identity of a user opening a new user account for such online services, in order in particular to avoid cases of fraud by identity theft.

Figure 1:
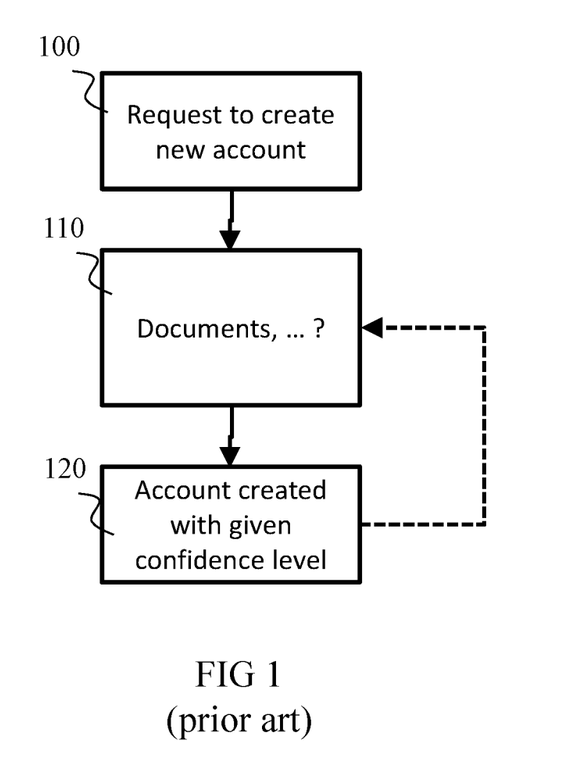
FIG. 1 is an illustration of a prior art for creating a user account of an online service and of an associated parameter indicating a confidence level.

Conventionally, as illustrated in FIG. 1, a step of checking the identity of a user wishing to create a new user account for such an online service is carried out during the phase of creating the new user account of the online service. Thus, following a first step 100 requesting the creation of a new user account by a user, a step 110 of checking the identity of this user is performed. According to the confidence level required by the online service as to the identity of the user, the user may be requested to send documents, for example copies of identity documents, or, in order to best check on his identity, have to present the originals of these documents during an interview. At the end of this verification step 110, the creation of the new user account is validated (step 120), ending the process of creating the new user account for the online service. The confidence level that the method of creating a user account offers as to the real identity of the user originating the request to create the new account depends on the verification step 110. When the verification step 110 includes a meeting between the user and a trusted person, as well as the supply of various original documents, a greater level of confidence as to the identity of the user is granted than for a method relying on a purely declaratory verification step 110, that is to say based solely on the declarations of the user. On the other hand, the verification step 110 may then be experienced by the user as particularly restrictive, if he has to have a meeting or travel to submit himself to it. Some methods for checking the identity of the user of a new user account function iteratively. They allow the creation of a new user account after a first simple verification step 110, for example purely declaratory or by means of the sending of a copy of a document by email. Such a user account is then associated, when it is created, with a parameter indicating a low confidence level. In this case, the user account does not have access to all the services offered by the online service. For example, such a newly created user account may only access online banking services in consultation. The user of such a user account must therefore submit himself to a second more thorough step 110 of checking his identity. This second verification step 110 may consist of a telephone discussion. At the end of this second verification step 110, the confidence level associated with the user account is increased, then allowing access to all the services offered by the online service. It is thus possible to have several iterations of the verification step 110, the level of confidence as to the identity of the user associated with the user account then being able to take one value from a plurality of possible values, according to the verification criteria fulfilled at each iteration of the verification step 110. The user account may have access to different services of the online service according to the confidence level associated with the user account. This method of creating a new user account by a user nevertheless relies on one or more steps of checking the identity of the user, which may be particularly time-consuming for the user. A verification step comprising an interview may for example oblige the user to travel, which may be problematic for a user living abroad. Organising interviews requires establishing logistics, which has an implementation cost, and may require the recruitment and training of persons carrying out the interviews.

It is therefore necessary to propose a method making it possible to obtain a good level of confidence as to the identity of a user who has created a user account without presenting the drawbacks mentioned above.

DISCLOSURE OF THE INVENTION

The present invention relates to a method for checking the value of a parameter indicating a confidence level associated with a first user account of an online service, each user account of the online service comprising associated user data and contact means making it possible to get into contact with a user of said user account, the method being executed by at least one server hosting the online service. The method comprises the steps of selecting at least one second user account of the online service, generating a first code for each second user account of the online service, recording the first code in association with the first user account of the online service, sending a first message via a contact means associated with the second user account of the online service, the first message comprising the first code generated, and subsequent steps of receiving, from a first electronic device connected to the online service with the first user account of the online service, a second message comprising a second code, when the second code is equal to the first code recorded in association with the first user account of the online service, then increasing the value of the parameter indicating the confidence level associated with the first user account of the online service.

Advantageously, the method contributes the users of the online service in order to increase the confidence level associated with a given user account of the online service. The method makes it possible to introduce a concept of co-option, sponsoring or guarantee between users of the online service. Thus, in order to increase the confidence level associated with the first user account of the online service, the first code is generated and sent to at least one user of a second user account of the online service. The user of the second user account, if he knows the user of the first user account of the online service, can then transmit the code received to this user of the first user account if he wishes to sponsor this user of the first user account of the online service. The user of the first user account then supplies to the online service, in association with the first user account, the code received from the user of the second user account. Once it has been checked that the code supplied and the code generated correspond, that is to say that they are equal, the online service confirms the fact that the user of the first user account of the online service has been recognised by the user of the second user account of the online service by increasing the confidence level associated with the first user account of the online service. According to the confidence level associated with the first user account of the online service that has thus been obtained, the online service is capable of determining which services are actually accessible from this first user account of the online service.

According to a supplementary embodiment of the invention, the first message sent comprises at least one user data item associated with the first user account of the online service in order to allow identification of the user of the first user account of the online service by the user of the second user account of the online service.

Advantageously, an item of information chosen from the user data associated with the first user account of the online service is sent with said first code to the user of the second user account of the online service so that the user of the second user account of the online service can easily identify the user of the first user account of the online service in order to decide or not to send to him said first code received.

According to a supplementary embodiment of the invention, the selection of the second user account of the online service comprises the following steps: receiving a third message from a second electronic device connected to the online service with the first user account of the online service, the third message comprising identification data allowing connection to a user account of a social network hosted by at least one server, the user account of the social network comprising a list of other user accounts of the social network connected to said user account of the social network, establishing a connection with at least the server hosting the social network using the identification data received, finding, on the server hosting the social network, user data linked to the other user accounts of the social network connected to the account of the social network, and selecting a second user account of the online service for which at least one value of a predetermined user data item among the user data of this second user account of the online service is equal to a value of a predetermined user data item among the user data found of the other user accounts of the social network.

Advantageously, the selection of the second user account of the online service is facilitated, and especially more relevant, by relying on an existing social network. According to this embodiment of the invention, the user of the first user account of the online service supplies to the online service identification data making it possible to connect to a user account of said social network, typically a user account of the social network belonging to the user of the first user account of the online service. The online service, that is to say the server hosting the online service, can then connect to this user account of the social network using said identification data and obtain from the social network a list of contacts associated with said user account of the social network. The online service, that is to say the server hosting the online service, can then seek, among its own user accounts, a user account of the online service corresponding to a contact, according to the social network, of the user of the first user account. The first code is then sent to the user of this user account. The fact that the users of user accounts are connected via the social network improves the relevance of the request for co-option, and thus makes it possible to drastically reduce the sending of such first messages to non-relevant users. This therefore makes it possible to reduce overall the number of messages sent by the server hosting the online service, thus preserving the bandwidth. This also makes it possible to reduce the number of messages received by the users of the online service, preventing in particular the messages being in the end considered to be unsolicited messages (spam) and therefore ignored.

According to a supplementary embodiment of the invention, the selection of at least one second user account of the online service comprises the following steps: selecting at least one user account of the online service a user data item of which is equal to a user data item of the first user account of the online service, sending a message comprising said selection of user accounts of the online service to the first device, so as to present to the user of the first user account of the online service said selection of user accounts of the online service on a graphical interface of the first device, and receiving a message coming from the first electronic device comprising an indication of the choice made by the user of at least one second user account of the online service among said selection.

Advantageously, the server hosting the online service selects, among user accounts of the online service, those that share a match with the first user account of the online service, for example a location, a name, a company or other information included in the user data. This selection is presented to the user of the first user account of the online service, who can then make a choice of the second user account of the online service to which a generated code is next sent. By enabling the user of the first user account of the online service to best target which user will be approached in order to attempt to increase the confidence level associated with the first user account of the online service, the number of messages sent is reduced.

According to one embodiment of the invention, the selection of the second user account of the online service comprises a step, prior to the other selection steps, of restricting the selection step solely to the user accounts of the online service associated with a value of a parameter indicating a confidence level higher than a predetermined value, Advantageously, a first selection step is performed in order to check that the second user account of the online service selected in the end is associated with a confidence level above a predetermined value. Thus only user accounts of the online service considered as confidence can play a co-option role. This makes it possible to drastically reduce the possibilities of identity theft for an attacker attempting to create several user accounts of the online service in parallel so as to increase their confidence levels using the method of the invention between these same accounts.

According to one embodiment of the invention, the first code is generated in association with the first and second user accounts of the online service, the second message comprising user data, and the value of the parameter indicating the confidence level associated with the first user account of the online service is increased only when the second code is equal to the first code recorded in association with the first user account of the online service and the user data received correspond to user data of the second user account of the online service.

Advantageously, the online service checks that the second code is indeed supplied in association with the second user account of the online service. This makes it possible to guarantee that the user of the first user account of the online service actually knows the user of the second user account of the online service.

The present invention also relates to a server hosting an online service, the server implementing a method for checking a parameter indicating a confidence level associated with a first user account of the online service, each user account of the online service comprising associated user data and contact means making it possible to get in contact with a user of said user account, the server comprising means for selecting a second user account of the online service, means for generating a first code, means for recording the first code in association with the first user account of the online service, means for sending a first message via contact means associated with the second user account of the online service, the first message comprising the first code generated, means for receiving, from a first electronic device connected to the online service with the first user account of the online service, a second message comprising a second code, means for determining when the second code is equal to the first code recorded in association with the first user account, and means for increasing the value of the parameter indicating the confidence level associated with the first user account of the online service.

The present invention also relates to a computer program comprising instructions for the implementation, by a processor, of the method for checking a parameter indicating a confidence level associated with a first user account of an online service as described in the present document, when said computer program is executed by said processor.

The present invention also relates to storage means storing said computer program.

DESCRIPTION OF THE DRAWINGS

The features of the invention mentioned above, as well as others, will emerge more clearly from a reading of the following description of an example embodiment, said description being given in relation to the accompanying drawings, among which.

DETAILED DISCLOSURE

Figure 2:
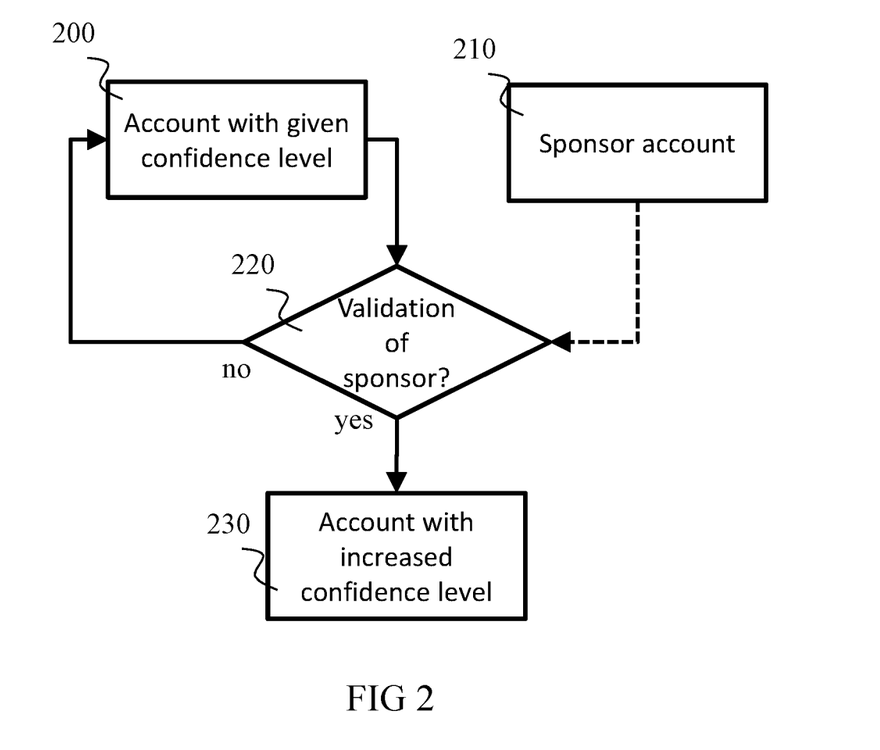
FIG. 2 is a schematic representation of a method for checking a parameter indicating a confidence level associated with a user account of an online service.

FIG. 2 is a schematic representation of a method for checking a parameter indicating a confidence level associated with a user account of an online service. The online service may be provided or hosted by server equipment 300, that is to say a server or a plurality of cooperating interconnected servers, as described below in relation to FIG. 3. Such an online service may be a service of the "online bank", "online administration", "online brokerage or stock exchange" etc type. A user of such an online service accesses said online service on an electronic device connected to the online service. The electronic device is typically a smartphone, a computer, a tablet or any electronic device having access to a communication network making it possible to establish a connection with the online service, that is to say with the server equipment 300 hosting said online service. The electronic device is connected to the online service with a user account of the online service previously created. A user account of the online service may be associated with a physical person or a legal person, that is to say ultimately a group of physical persons. The generic term "user" is used here to designate any of these various cases. A user account of the online service comprises identification data, enabling a user to authentic himself when connecting to the online service, typically an identifier ("login") and a password. The identification data may comprise biometric data or any other data useful to the implementation of an authentication method (password, enciphering key used for authentication, etc). User data are associated with a user account of the online service. These user data typically comprise data relating to the identity of the user of the user account of the online service. The user data comprise for example a surname, a first name, a date of birth, a place of birth, a postal address, an identity card number, a fax number or any other data particular to the user account or to the user of the user account of the online service (for example a list of bank accounts associated with a user account of the online service in the context of an online bank service).

One or more contact means are associated with each user account of the online service. Contact means means any information enabling the online service to get in contact with a user of the online service. "Contact" means "send a message". In other words, a contact means may be of different natures, for example:

- a telephone number: the online service may, via a voice server, send voice messages to such a number,
- a mobile telephone number: the online service may send short messages (SMS: short message service) to a telephone number of a mobile,
- a fax number: the online service may send a fax to such a number,
- an electronic address: the online service may send an email,
- a postal address: the online service may automate the drafting and sending of letters then distributed by a postal service or courier,
- any identifier of a communication service: the online service may have one or more identifiers on this same communication service in order to be able to send a message via this communication service (for example a service of the "instantaneous messaging" or "chat" type),
- an identifier internal to the online service: the online service may comprise an internal messaging system allowing the exchange of a message between users of the online service and/or the sending, by the server 300 hosting the online service, of messages for the attention of one or more users, that is to say to their respective user accounts of the online service.

A parameter indicating a confidence level is associated with each user account of the online service. Such a parameter is a representation of the confidence level granted to the actual identity of the user of said user account of the online service vis-à-vis a declared identity of the user account of the online service when the user account of the online service is created. The declared identity of a user account of an online service corresponds for example to the surnames and first names included in the user data of said user account of the online service, or to a company name for a company. These user data are supplied by the user when the user account of the online service is originally created, and are checked, or not, during the previously described verification step 110. The confidence level of each user account of the online service is independent of the authentication method used to connect to said user account of the online service. A user whose identity has been checked robustly, and therefore where the confidence level associated with the user account of the online service is high, can connect to his user account of the online service via a reliable authentication method. Likewise, a user who has created a user account of the online service on a solely declaratory basis, and who therefore has a low confidence level associated with the user account of the online service, can connect to his user account of the online service with very robust methods (biometry, etc). By convention, a high confidence level is associated with a comparatively high value of the parameter indicating the confidence level. Another choice, purely conventional, may be made.

The method for checking the parameter indicating the confidence level associated with a first user account of the online service, which is illustrated schematically in FIG. 2, is executed by the server equipment 300 hosting the online service. A particular embodiment is detailed below in relation to the description of FIG. 4. In a step 200, a first user account of the online service is associated with a first value of the parameter indicating a confidence level. It may be a case for example of a low confidence level (relatively low value of the parameter indicating the confidence level), given by default to any newly created user account of the online service. The server 300 selects a second user account of the online service in a step 210. The second user account of the online service is said to be a "sponsor account" or a "referrer account". This second user account of the online service among the user accounts of the online service may be selected in accordance with various methods. The selection may thus be the result of chance or be done in accordance with one of the embodiments described above in relation to FIG. 4. The server 300 next generates a code, which is recorded by the server 300 in association with the first user account of the online service. The server sends a message, comprising the code generated, using the contact means associated with the second user account of the online service. In other words, the online service supplies the generated code to a user of the second user account of the online service. It is then necessary, if the user of the second user account of the online service knows the user of the first user account of the online service, and if the user of the second user account of the online service wishes to validate the identity of this user of the first user account of the online service, to supply the code received to this user of the first user account of the online service. Without any indication relating to the identity of the user of the first user account of the online service, the user of the second user account of the online service may have to wait to be contacted by the user of the first user account of the online service and confirm with him that the code received does indeed correspond to a request for verification of the first user account of the online service. There also, it is the responsibility of the user of the second user account of the online service to agree or not to supply the code to the user of the first user account of the online service. It is the supply or not of the code by the sponsor (the user of the second user account of the online service) to the user of the first user account of the online service that then enables the user of the first user account of the online service to validate a validation step 220. This is because, once the code has been transmitted to the user of the first user account of the online service, the latter can connect to the online service and enter the code received. This operation is performed from an electronic device connected to the server with the first user account of the online service. The server 300 receives a message, sent by the device, comprising the code entered. The server 300 next verifies that this code entered, received in the message, is equal to the code recorded in association with a first user account of the online service. If such is the case, this means that the sponsor has indeed validated the identity of the user of the first user account of the online service by transmitting the code to him, and that the confidence level of the first user account of the online service can be increased. In this case, in a step 230, the server 300 increases the value of the parameter indicating the confidence level associated with the first user account of the online service. The choice made here is that a high level of confidence in the identity of a user of a user account of the online service corresponds to a high value of the parameter. Any other conventional choice may be made. Supplements to the present method are detailed below in relation to FIG. 4.

Figure 3:
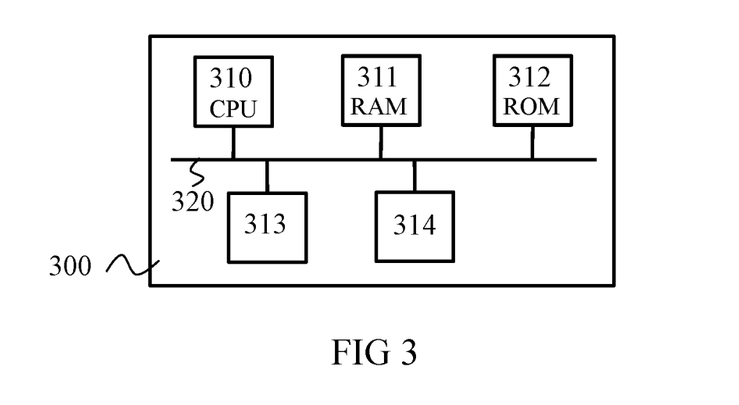
FIG. 3 is a schematic illustration of an example of hardware architecture of a server able to implement the invention.

FIG. 3 is a schematic illustration of an example of hardware architecture of a server 300 able to implement the invention. The server 300 comprises, connected by a communication bus: a processor or CPU (Central Processing Unit) 310, a Random Access Memory (RAM) 311; a Read Only Memory (ROM) 312; a storage unit or a storage medium reader, such as an SD (Secure Digital) card reader or a Hard Disk Drive (HDD) 313; and at least one network interface 314 enabling the server 300 to access a communication network for communicating with electronic devices by which the users of the user accounts of the online service access said online service. The network interface 314 enables for example the server 300 to access the internet. As the server 300 hosts the online service, the server 300 executes at least one application offering said online service, ie functionalities, to users. Possibly, a user accesses the online service through an electronic device connected to the server 300. The connection to the server 300 hosting the online service is made by supplying identification data corresponding to a user account of the online service known to the online service. In other words, the data associated with the user account of the online service may be stored or recorded by the server 300, possibly in a storage unit 131 or a remote data base, hosted by another server, and accessible via the network interface 314. The processor 310 is capable of executing instructions loaded into the RAM 311 from the ROM 312, from a memory or storage medium, internal or external, 313 or from a communication network via the network interface 314. When the server 300 is powered up, the processor 310 is capable of reading instructions in the RAM 311 and executing them. These instructions form a computer program allowing the implementation or execution, by the processor 310, of all or some of the methods and steps described in the present document. Thus all or some of the methods and steps described in the present document may be implemented in software form by the execution of a set of instructions by a programmable machine, such as a DSP (Digital Signal Processor) or a microcontroller. All or some of the methods and steps described below can also be implemented in hardware form by a machine or a dedicated component, such as an FPGA (Field-Programmable Gate Array) or an ASIC (Application-Specific Integrated Circuit).

Figure 4:
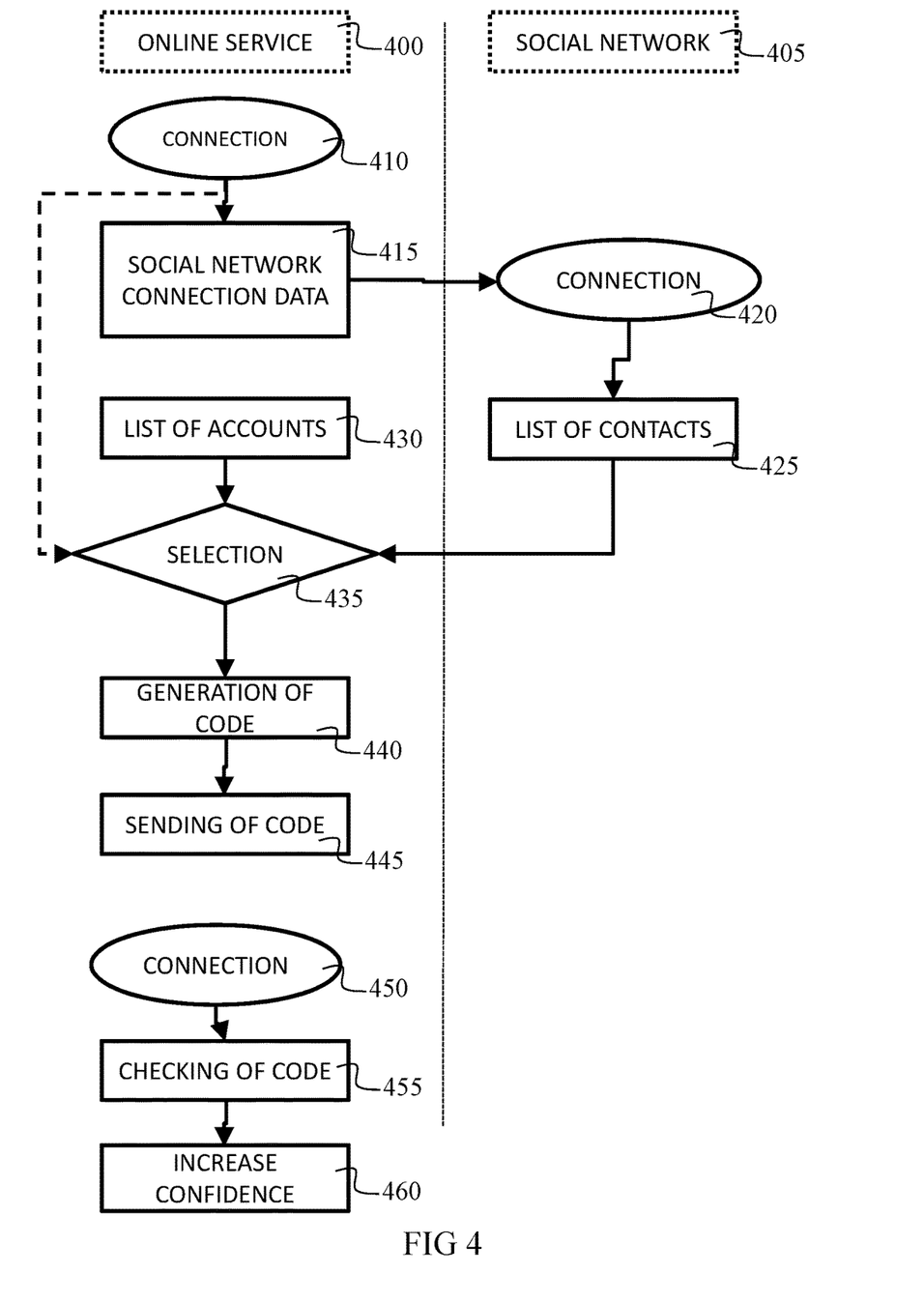
FIG. 4 is an illustration, according to a particular embodiment of the invention, of a method for checking a parameter indicating a confidence level associated with a first user account of an online service.

FIG. 4 is an illustration, according to a particular embodiment of the invention, of a method for checking the parameter indicating the confidence level associated with the first user account of the online service 400. This embodiment is in accordance with the method illustrated schematically in FIG. 2, the step of selecting a second user account of the online service 400 being more particularly detailed according to a particular embodiment. This particular embodiment is based on the use of a second online service 405 of the social network type. A social network is a type of online service in which the users can create user accounts of the social network and which offers services so that the users can create links or connections between these user accounts of the social network, these links representing social links (group of friends, family, professional links, etc). A social network may offer other types of service (messaging, content sharing, etc). A social network corresponds to an online service provided by at least one application hosted by at least one server.

In a first step 410, a user of the first user account of the online service 400 connects, from a first electronic device (for example a smartphone, a computer or an electronic tablet), to the online service 400, that is to say to a server 300 hosting the online service. In other words, the user uses the first electronic device by executing for example an application dedicated to the online service 400 or so-called web browser software, to connect this first electronic device to the server 300 hosting the online service 400 with the first user account of the online service. "Connect with the first user account of the online service 400" means that the user of the first user account of the online service 400 supplies to the first electronic device, via a man-machine interface, the identification data associated with the first user account of the online service 400, and that the first electronic device authenticates itself with the server 300 with these identification data. The first electronic device is therefore connected to the online service 400, that is to say to the server 300, with the first user account of the online service 400.

In step 415, the server 300 receives a first message from the first electronic device, the first message comprising identification data allowing connection to a user account of the social network 405, this user account of the social network 405 comprising a list of other user accounts of the social network 405 connected to said user account of the social network 405. In other words, the user supplies, to the online service 400, identification data associated with the user account of the social network 405 allowing connection to said social network 405 with said user account of the social network. Typically, the user enters, in an interface of the dedicated application executed by the first electronic device (or of the web interface displayed by said electronic device), an identifier and password making it possible to connect to the social network 405 with the user account of the social network. The first electronic device next sends the identification data (here an identifier and password) to the server 300 in the first message.

In a step 420, the server 300 establishes a connection to the social network 405, that is to say to the server hosting the application providing the social network online service, using the identification data received in the first message. For this purpose, the server 300 sends a connection message or request, typically comprising the identification data (for example an identifier and a password), to a server hosting the social network 405, exchanges of messages in the end making it possible to establish the connection.

In a step 425, the server 300 finds, on the social network 405, that is to say on the server hosting the application providing the social network online service, user data connected to the other user accounts of the social network connected to the user account of the social network. In other words, the server 300 sends to the social network 405, that is to say through the server hosting the application providing the social network online service, a request to receive in return the list of contacts connected to the user account of the social network 405. The request uses for example a programming interface (or "Application Programming Interface"—API) offered by the social network 405. This request may take the form of an HTTP (HyperText Transfer Protocol) command of the "GET" type. The user data connected to the other user accounts of the social network connected to the user account of the social network are typically the surnames and first names of the users of the accounts. These user data may also comprise information such as addresses (or just an indication of country, of a town, of a district, of a street, etc), dates of birth, places of birth, current or past places of work, studies followed, identity card number etc.

A parameter indicating the degree of knowledge may also be included in the list for each contact found (close or distant family, friend, colleague, professional relationship, acquaintance, etc).

In a step 430, the server 300 finds a list of the user accounts of the online service 400. This list may comprise all the user accounts of the online service 400. According to a supplementary embodiment of the invention, the server 300 may select only user accounts of the online service 400 associated with a value of a parameter indicating a confidence level higher than a predetermined value. Thus only user accounts of the online service 400 having a minimum confidence level may be selected as a sponsor. In other words, according to this supplementary embodiment, the server 300 carries out a first filtering of the list of user accounts of the online service 400 selecting only the user accounts of the online service 400 associated with a value of a parameter indicting a confidence level higher than a predetermined value. According to another supplementary embodiment of the invention, the first filtering may also relate to user data of the user accounts of the online service 400, seeking for example only user accounts of the online service 400 sharing user data with values equal to values of user data of the first user account of the online service. For example, the server 300 may, during this step 430, find only the list of user accounts of the online service 400 associated with "country" or "town" user data with a value equal to the corresponding user data of the first user account of the online service 400. In other words, the server 300 may select, during this step 430, only user accounts of the online service 400 corresponding to users in the same country or the same town or working for the same company as a user of the first user account of the online service 400.

In a step 435, the server 300 selects, from the user accounts of the online service 400 found during step 430, optionally filtered as described previously, at least one second user account of the online service 400 for which at least one value of a predetermined user data item among the user data of said user account of the online service 400 is equal to a value of a predetermined user data item among the user data found of the other user accounts of the social network 405. In other words, the server 300 establishes a match between a list of user accounts of the online service 400 and the list of contacts of user accounts of the social network 405 previously received in order to find the common elements. The match may be established by seeking identical values of user data of the user accounts of the online service 400 and of the social network 405 such as "surname and first name", "surname, first name, and date of birth", "surname, first name, country and town", "identity card number" etc.

According to a supplementary embodiment, the server 300 selects at least one user account of the online service 400 a user data item of which is equal to a data item of the first user account of the online service 400 and then presents said selection of user accounts of the online service 400 to the user of the first user account of the online service 400. For this purpose, the server 300 sends a message comprising the selection of user accounts of the online service 400 to the first electronic device. The first electronic device then presents, in a graphical user interface, said selection received from the server 300. The application executed by the first electronic device invites the user to choose one or more user accounts of the online service 400 from the selection displayed and returns the result to the online service 400, that is to say to the server 300. The server 300 therefore receives a message comprising an indication of the choice made by the user of at least one second user account of the online service 400 from the selection presented, this choice corresponding to the selection of at least one second user account of the online service 400.

Thus steps 425, 430 and 435 enable the server 300 to select at least one second user account of the online service 400 corresponding to a user of the social network 405 connected to a user of the first user account of the online service 400, optionally enabling the user to select the second user account of the online service 400 from a selection of user accounts of the online service 400.

In a step 440, the server 300 generates a first code for each second user account of the online service 400 selected. The server 300 records this first code in association with the first user account of the online service 400, for example in a storage unit 313.

In a step 445, the server 300 sends a second message via a contact means associated with the second user account of the online service 400, the second message comprising the first code generated. According to the contact means, the second message may be sent according to a different method. For example, if the contact means is an email address, the message may be sent to a messaging server (a so-called SMTP—Simple Mail Transfer Protocol—server) known to the server 300. If the contact means is a mobile telephone number, the destination of the second message may be a server of the SMS-C (Short Message Service Centre) type. According to a supplementary embodiment, the second message sent comprises at least one user data item associated with the first user account of the online service 400 to allow the identification of a user of the first user account of the online service 400 by the user of the second user account of the online service 400. The second message may comprise information such as a surname and/or a first name for facilitating the identification of the user of the first user account of the online service 400 when the message is received and read by its addressee.

The following steps of the method are performed not by the server 300 but by the users of the user accounts of the online service 400 themselves:
- the user for whom the first message is intended, that is to say the user of the second user account of the online service 400, receives the first code, optionally accompanied by information for identifying the user of the first account seeking to be sponsored,
- this user of the second user account of the online service 400 identifies the user of the first user account of the online service 400, either easily, since he has received a name with the first message, or by discussing it with various users. Possibly, the user of the first user account of the online service 400 may use another communication channel (an announcement via the social network 405 for example) in order to announce that messages for sponsoring him have been sent. The user of the second user account of the online service 400 may decide or not to respond favourably to the request from the user of the first user account of the online service 400,
- if the user of the second user account of the online service 400 decides to accept to sponsor the user of the first user account of the online service 400, he transmits, by any means, the first code to the user of the first user account of the online service 400.

In a step 450, the server 300 receives a request for connection to the online service 400 with the first user account of the online service 400 from a second electronic device, the second electronic device possibly being the same electronic device as the first electronic device.

In a step 455, a graphical interface presented on the second electronic device enables the user of the first user account of the online service 400 to enter a second code. The second code entered is deemed to be a code received, by the user of the first user account of the online service 400, from a user of a said second user account of the online service 400 wishing to sponsor him. The second electronic device sends a third message comprising this second code to the server 300. Thus the server 300 receives, from the second electronic device connected to the online service 400 with the first user account of the online service 400, the third message comprising the second code.

In a step 460, when the second code is equal to the first code recorded in association with the first user account of the online service 400, the server 300 increases the value of the parameter indicating the confidence level associated with the first user account of the online service 400. In other words, the server 300, after having checked that the code received during step 455 is equal to the code sent during step 445, increases the confidence level associated with the first user account of the online service 400.

According to a supplementary embodiment of the invention, data for geolocation of the electronic devices used by the user of the first user account of the online service 400 and by the user of the second user account of the online service 400 are compared in order to check on the physical presence of these users in the same place when the second code is entered. The confidence level is then increased only if the second code is equal to the first code recorded in association with the first user account of the online service 400 and the data for geolocation of the two electronic devices used indicate a proximity (for example the two electronic devices used are distant by less than one metre). This additional check makes it possible to ensure that the users do indeed physically meet when the code is exchanged.

According to an alternative embodiment of the invention, during step 445, the server 300 sends the second message via a contact means associated with a second user account of the online service 400, the second message comprising the first code generated, this first code generated being presented in the form of a barcode (for example a QR code—"Quick Response code"). Thus, if the user of the second user account of the online service 400 decides to accept sponsoring the user of the first user account of the online service 400, he presents the barcode received to the user of the first user account of the online service 400. The latter can then use the second electronic device to read this barcode, this reading of the barcode replacing the step 455 of manual entry of the second code. The second electronic device deciphers the barcode and sends this first deciphered code in the third message. This method thus makes it possible there also to check on a physical proximity of the users during the step of exchanging the code. According to a supplementary embodiment of the invention, the barcode comprises the first code in an enciphered form, the deciphering key corresponding to this enciphering being sent in another message in parallel to the electronic device of the user of the first account. Thus only this device is capable of reading and then deciphering the barcode.

According to a supplementary embodiment, during step 440 the first code is generated in association with the first user account of the online service 400 and the second user account of the online service 400. In addition, the third message received during step 455 comprises user data. The server 300 checks that the user data received in the third message are equal to user data of the second user account of the online service. In other words, when the user of the second electronic device enters the second code in the graphical interface, the second code is associated with user data (surname, first name, etc) corresponding to the user that supplied the second code to the user of the first user account of the online service 400. It is thus not possible during step 455 to enter codes by chance hoping to hit on a code actually generated since user data corresponding to the second user account of the online service 400 must be supplied simultaneously.

According to a supplementary embodiment of the invention, the server 300, during step 435 of selecting the second account of the online service 400, adds selection criteria from the following:

the value of the parameter indicating a confidence level associated with the second user account of the online service 400 is higher than a predetermined value, alternatively, or in addition, said value of the parameter indicating a confidence level associated with the second user account of the online service 400 is higher than the value of the parameter indicating a confidence level associated with the first user account of the online service 400.

The invention claimed is:

1. A method being executed by at least one server hosting online service having a plurality of user accounts, the method comprising:

checking value of a parameter indicating a confidence level associated with a first user account of the online service, each user account of the online service comprising user data and an associated contact means for getting in contact with a user of said user account, said checking comprises:

selecting at least one second user account of the online service and contact means for getting in contact with a user of said at least one second user account, said second user being different from the user of said first user account, generating a first code for each second user account of the online service, the first code being a barcode, recording the first code in association with the first user account of the online service, sending a first message via the contact means for getting in contact with the second user that is different from the user of said first account, the first message comprising the first code generated, and the subsequent steps of:

receiving, from a first electronic device connected to the online service with first user account of the online service, a second message comprising a second code, when the second code is the deciphered barcode, then increasing the value of the parameter indicating the confidence level associated with the first user account of the online service.

2. The method according to claim 1, the first message sent comprising at least one user data item associated with the first user account of the online service in order to allow identification of the user of the first user account of the online service by the user of the second user account of the online service.

3. The method according to claim 2, the selecting of the second user account of the online service comprising:

receiving a third message from a second electronic device connected to the online service with the first user account of the online service, the third message comprising identification data allowing connection to a user account of a social network hosted by at least one server, the user account of the social network comprising a list of other user accounts of the social network connected to said user account of the social network, establishing a connection with at least the server hosting the social network using the identification data received, finding, on the server hosting the social network, user data linked to the other user accounts of the social network connected to the account of the social network, and selecting a second user account of the online service for which at least one value of a predetermined user data item among the user data of this second user account of the online service is equal to a value of a predetermined user data item among the user data found of the other user accounts of the social network.

4. The method according to claim 3, the selecting of the second user account of the online service comprising, prior to the selecting steps, restricting the selection step solely to the user accounts of the online service associated with a value of a parameter indicating a confidence level higher than a predetermined value.

5. The method according to claim 3, the first code being generated in association with the first and second user accounts of the online service, the second message comprising user data, the value of the parameter indicating the confidence level associated with the first user account of the online service being increased only when the second code is equal to the first code recorded in association with the first user account of the online service and the user data received correspond to user data of the second user account of the online service.

6. The method according to claim 1, the selecting of at least one second user account of the online service comprising:

selecting at least one user account of the online service a user data item of which is equal to a user data item of the first user account of the online service, sending a message comprising said selection of user accounts of the online service to the first device, so as to present to the user of the first user account of the online service said selection of user accounts of the online service on a graphical interface of the first device, and receiving a message coming from the first electronic device comprising an indication of the choice made by the user of at least one second user account of the online service among said selection.

7. A server hosting an online service, the server comprising:

circuitry adapted for:

checking a parameter indicating a confidence level associated with a first user account of the online service, each user account of the online service comprising associated user data and contact means makingcontact with a user of said user account possible, said checking comprising:

selecting a second user account of the online service and contact means for getting in contact with a user of said at least one second user account, said second user being different from the user of said first user account, generating a first code, the first code being a barcode, recording the first code in association with the first user account of the online service, sending a first message via the contact means for getting in contact with the second user that is different from the user of said first user account, the first message comprising the first code generated, receiving, from a first electronic device connected to the online service with the first user account of the online service, a second message comprising a second code, determining when the second code is when the second code is the deciphered barcode, and increasing the value of the parameter indicating the confidence level associated with the first user account of the online service.

8. A non-transitory storage medium that stores a computer program comprising instructions for implementation, by a processor, of the method for checking a parameter indicating a confidence level associated with a first user account of an online service according to claim 1, when said computer program is executed by said processor.

\* \* \* \* \*